Patented May 9, 1944

2,348,683

UNITED STATES PATENT OFFICE 2,348,683

SEPARATION OF DI-ISOPROPYL AMINE FROM ISOPROPYL ALCOHOL

James F. McKenna, Wyandotte, Mich., assignor to Sharples Chemicals Inc., Philadelphia, Pa., a corporation of Delaware No Drawing. Application April 3, 1942, Serial No. 437,552

4 Claims. (Cl. 202—42)

The present invention pertains to the separation of diisopropyl amine in relatively pure form from mixtures thereof with isopropyl alcohol.

When ammonia is reacted with isopropyl alcohol, a mixture of mono- and di-isopropyl amines is obtained, together with other reaction products and unchanged reactants, depending upon the nature and proportions of the reactants, and the reaction conditions. Thus, when isopropyl alcohol is passed in known manner in vapor phase together with ammonia over a dehydrating or hydrogenating catalyst, a mixture of mono-, and di-isopropyl amines with a certain amount of unchanged isopropyl alcohol, ammonia and other materials is obtained. Similarly, when acetone is reacted with ammonia and hydrogen under known conditions, a mixture containing the two isopropyl amines, together with ammonia, hydrogen, acetone and isopropyl alcohol is obtained.

The separation of ammonia, hydrogen, acetone, and mono-isopropyl amine from the reaction mixtures discussed above presents no particular problem, since each of these substances boils at a point considerably below the boiling points of the isopropyl alcohol and the di-isopropyl amine, and the separation can be effected by orthodox distillation procedure. The present invention is concerned with the problem of the separation of di-isopropyl amine from isopropyl alcohol, whether the mixture to be separated is obtained from the amination reaction or otherwise.

In accordance with the present invention the problem of separating the isopropyl alcohol from the di-isopropyl amine is solved by adding or providing in the mixture containing the iso-propyl alcohol and the di-isopropyl amine a substantial amount of water. By distilling such a mixture, it has been found possible to remove all of the di-isopropyl amine in the form of a constant boiling mixture with water, leaving the isopropyl alcohol as a residue of the distillation. Isopropyl alcohol forms with water a binary constant boiling mixture which boils at 80.5° C. Di-isopropyl amine forms with isopropyl alcohol a binary constant boiling mixture which boils at 79° C. From these facts, it was to be inferred that the addition to or presence in a mixture of di-isopropyl amine and isopropyl alcohol, of water, would not assist the separation in any way, and might indeed render it more difficult. When water is actually added to such a binary mixture of the alcohol and amine, however, and heat applied, a constant boiling mixture of water and the amine comes overhead at approximately 74° C., and it is somewhat surprising that this constant boiling mixture is free of isopropyl alcohol. By providing a sufficient amount of water to remove all of the di-isopropyl amine as a distillate in the form of a constant boiling mixture, the di-isopropyl amine can be practically completely separated from the isopropyl alcohol. The ratio of the water to the di-isopropyl amine in the constant boiling mixture of these two substances is approximately 1:5, and sufficient water should be provided to effect the complete removal of the di-isopropyl amine in the form of such a mixture. The desired amount of water may be added as such, or in the form of steam to promote the distillation. In any case, it is preferable that the water added to assist in removing the di-isopropyl amine be limited to an amount which is not substantially greater than that necessary to remove all of the di-isopropyl amine as a constant boiling distillate, since any water in excess of the amount necessary to form the constant boiling mixture will remain with the residual isopropyl alcohol and must ordinarily be removed therefrom later. While such removal can be accomplished by fairly simple and known procedure, it represents an expense, and this expense can be avoided or minimized by proper control of the quantity of water added either at the start of the distillation or intermittently or continuously during the course thereof to assist in removal of the di-isopropyl amine.

After removal of the di-isopropyl amine from the iso-propyl alcohol in the form of a constant boiling mixture with water, the di-isopropyl amine can be separated from the water with which it is removed by fairly simple procedure, such as dehydration with caustic soda or any other suitable dehydrating agent.

Example 100 cc. of anhydrous alcohol and 100 cc. of dry di-isopropyl amine was distilled through a laboratory column of the total condensation, partial take-off type having a section 18 mm. by 4 ft. packed with glass helices. There was removed 130 cc. of a constant boiling mixture of isopropyl alcohol and di-isopropyl amine which boiled at 79° C. while the residue left in the flask was found to be practically pure isopropyl alcohol.

A second mixture of 100 cc. of isopropyl alcohol, 100 cc. of di-isopropyl amine and 100 cc. of water was distilled through the same column in a manner identical with that described above.

This time there first was obtained an 80 cc. fraction composed of a constant boiling mixture of water and di-isopropyl amine which distilled at 74–74.5° C. and after that a second fraction of 100 cc. composed of water and isopropyl alcohol which boiled at 80–81° C. The residue was almost entirely water.

I wish it to be understood that the invention is not limited to the specific embodiments discussed above, but includes all such modifications as fall within the scope of the following claims.

I claim:

1. In the separation of di-isopropyl amine from mixtures containing di-isopropyl amine and isopropyl alcohol, the process comprising removing the di-isopropyl amine by providing a mixture containing sufficient water to form a binary constant boiling mixture with all of the di-isopropyl amine present, thereafter distilling said di-isopropyl amine overhead as a constant boiling mixture with said water, and thereafter separating the di-isopropyl amine removed overhead from the water contained in the overhead distillate.

2. In the separation of di-isopropyl amine from mixtures containing di-isopropyl amine and isopropyl alcohol, the process comprising adding to the mixture to be subjected to the separating operation water in an amount sufficient to form a constant boiling mixture with all of the di-isopropyl amine of the mixture, distilling said di-isopropyl amine overhead as a constant boiling mixture with water, and thereafter separating the di-isopropyl amine removed overhead from the water contained in the overhead distillate.

3. In the separation of di-isopropyl amine from mixtures containing di-isopropyl amine and isopropyl alcohol, the process comprising adding to the mixture to be subjected to the separating operation water in an amount sufficient to form a constant boiling mixture with all of the di-isopropyl amine of the mixture, distilling said di-isopropyl amine overhead as a constant boiling mixture with water, and thereafter separating the di-isopropyl amine removed overhead from the water contained in the overhead distillate, the water added to assist in removal of di-isopropyl amine by formation of a constant boiling mixture being added prior to the beginning of the distillation operation.

4. In the separation of di-isopropyl amine from mixtures containing di-isopropyl amine and isopropyl alcohol, the process comprising adding to the mixture to be subjected to the separating operation water in an amount sufficient to form a constant boiling mixture with all of the di-isopropyl amine of the mixture, distilling said di-isopropyl amine overhead as a constant boiling mixture with water, and thereafter separating the di-isopropyl amine removed overhead from the water contained in the overhead distillate, the water added to assist in removal of di-isopropyl amine by formation of a constant boiling mixture being added during the course of the distillation operation.

JAMES F. McKENNA.